United States Patent [19]

Atwater et al.

[11] Patent Number: 4,903,163

[45] Date of Patent: Feb. 20, 1990

[54] DIRECTIONAL HARMONIC OVERCURRENT RELAY DEVICE

[75] Inventors: Philip L. Atwater, Golden; Malin L. Jacobs, Littleton, both of Colo.

[73] Assignee: The United States of America as represented by the Secretary of the Interior, Washington, D.C.

[21] Appl. No.: 349,736

[22] Filed: May 9, 1989

[51] Int. Cl.$^4$ ............................................... H02H 3/46
[52] U.S. Cl. ...................................... 361/113; 361/85; 361/87
[58] Field of Search .................... 361/65, 76, 77, 82, 361/84–87, 78, 113

[56] References Cited

U.S. PATENT DOCUMENTS

| | | | |
|---|---|---|---|
| 4,196,463 | 4/1980 | Dickerson | 361/113 |
| 4,208,687 | 6/1980 | Sun et al. | 361/76 |
| 4,477,854 | 10/1984 | Usui et al. | 361/113 |
| 4,513,344 | 4/1985 | Usui | 361/113 |

*Primary Examiner*—Todd E. Deboer
*Attorney, Agent, or Firm*—E. Philip Koltos

[57] ABSTRACT

A single or multiple phase directional harmonic overcurrent relay device suitable for simultaneously monitoring overcurrents at either of two harmonic frequencies in an electric power system is provided which comprises current and voltage input means, upper and lower harmonic current and voltage filters, a trip means which can enable an appropriate protective or diagnostic device when a condition of harmonic overcurrent exists, and a phase detection means which receives signals from the voltage and current filters and transmits a signal to the trip means only when the phase angle between the harmonic voltage and harmonic current is within a specified range. The two harmonics that are to be monitored simultaneously, such as the 5th and 7th harmonics, can be selected by means of a series of simple filter cards which can be inserted into a card cage in an apparatus housing the relay of the present invention. The relay of the present invention also employs adjustable taps for conveniently setting the minimum level of harmonic current corresponding to a condition of overcurrent, and provides a selection of time-overcurrent characteristic operating curves to delay the operation of the trip means once a condition of harmonic overcurrent has been detected. The relay is advantageous in that extremely low levels of harmonic overcurrent can be monitored so as to or prevent damage to a power system, and in that two harmonic currents may be monitored simultaneously.

24 Claims, 7 Drawing Sheets

FL
(300 Hz HARMONIC BANDPASS FILTER) CARD

FU
(420 Hz HARMONIC BANDPASS FILTER) CARD

4,903,163

DIRECTIONAL HARMONIC OVERCURRENT RELAY DEVICE

FIELD OF THE INVENTION

The invention relates to a single or multiple phase directional relay device for monitoring of low levels of harmonic currents in an electric power system.

BACKGROUND OF THE INVENTION

One of the major problems which affects present-day power systems is that they are designed for efficient operation only at fundamental or conventional power system frequencies. When other power equipment is used at or nearby a particular power system, it is quite common that frequencies generated by the equipment act to alter the currents and voltages of the power system so that a disruption of the power produced by the system can occur. Experts in the electric power industry have long studied the effects on electric power production caused by particular equipment in a continuing effort to monitor and alleviate such problems.

A particularly severe problem in this area is caused by the increased use of equipment that can generate harmonic currents and subsequent harmonic voltages in electric power systems. Harmonic generating equipment such as DC links, static VAR (volt-ampere reactive) compensators and large variable speed motor controllers are now commonly used in power systems. The systems which employ this equipment have been and will continue to be degraded by the effect of harmonic current generation so that the quality of electric power gradually decreases. A major cause for this substantial disruption is that the amount of harmonic current necessary to disturb the normal operation of electric power systems can sometimes be very small, e.g., less than 1% of the system, when compared to the full-load rating.

Another aspect of this problem is that harmonic current injected at one point on a power system can create disturbances hundreds of miles away from the source. Consequently, the damage caused to particular components of a power system when exposed to these harmonic currents can have extremely deleterious long-range results. Industry research into this problem has identified a number of cases where harmonic generation by one piece of equipment can cause a decrease in performance or more severe damage to another part of the electrical power system. For example, it has been determined that excessive 5th and 7th harmonic current present in the windings of a large steam-driven generator can combine to produce a potentially damaging 6th harmonic vibration in the turbine. Clearly, the need exists for a relay that can monitor and provide a protective response to low-level harmonic currents which are produced in electric power systems, particularly in situations where more than one harmonic current may be produced.

In the patent art, it has been known to provide various protective relays for power systems. For example, U.S. Pat. No. 4,513,344 (Usui) discloses a relay for detecting faults in a power system that includes means for extracting a fundamental wave component and a second harmonic component from a differential signal. In U.S. Pat. No. 3,579,040 (Tennenbaum) there is disclosed a protective relaying system in which the magnitude of the second harmonic component can trigger a set of restraint elements. Another patent along these lines is U.S. Pat. No. 4,689,708 (Hager et al) which provides a zone protective relay scheme for monitoring and controlling power lines including means for determining in which direction a fault is occurring. In none of these patents, however, is there disclosed a device which can accurately respond to low-level harmonic overcurrents produced in an electric power system and which can also be used to effectively monitor at least two different harmonic components at the same time.

SUMMARY OF THE INVENTION

In accordance with the present invention, a single or multiple phase directional harmonic overcurrent relay device for monitoring currents at one or more harmonic frequencies in an electric power system is provided which comprises:

a current input means for allowing current from the power system being monitored to enter said relay device and for channeling a signal proportional to said current to a harmonic current filter;

a current input overrange detector capable of receiving a signal from said current input means and capable of transmitting an inhibit signal to a harmonic time-overcurrent generation means when the signal received from the current input means corresponds to a condition of current overrange;

a polarizing voltage input means for allowing polarizing voltage from the power system being monitored to enter said relay device and for channeling a signal proportional to said polarizing voltage to a harmonic voltage filter;

at least one harmonic current filter capable of receiving a signal from said current input means and capable of channelling a signal proportional only to the particular harmonic frequency being monitored to a phase detection means and a minimum current pickup means;

at least one harmonic voltage filter capable of receiving a signal from said polarizing voltage input means and capable of channeling a signal proportional only to the particular harmonic frequency monitored to a polarizing voltage level detection means and a phase detection means;

a harmonic polarizing voltage level detector capable of receiving signals from at least one harmonic voltage filter and capable of transmitting a control signal to a harmonic time-overcurrent generation means;

harmonic current minimum pickup means capable of receiving signals from at least one harmonic current filter and capable of transmitting a signal proportional to the magnitude of the harmonic current to a harmonic time-overcurrent generation means;

harmonic phase detection means capable of receiving signals from said harmonic current and voltage filters and capable of transmitting a signal to a harmonic time-overcurrent generation means when the phase angle between the harmonic current and polarizing voltage falls within a given set of values;

harmonic time-overcurrent generation means capable of receiving signals from said harmonic polarizing voltage level detector, said harmonic phase detection means, said current input overrange detector, and said harmonic current minimum pickup means, and capable of signaling a trip means when a condition of overcurrent is sensed for a given duration of time; and a trip means capable of receiving signals from the harmonic time-overcurrent generation means, and capable of signaling an appropriate external protective or diagnostic device when a condition of overcurrent is present.

Other features and advantages of the present invention will be described or will be made obvious in the detailed description found hereinbelow.

BRIEF DESCRIPTION OF THE DRAWING FIGURES

DETAILED DESCRIPTION OF THE PREFERRED EMBODIMENTS

Figure 1:
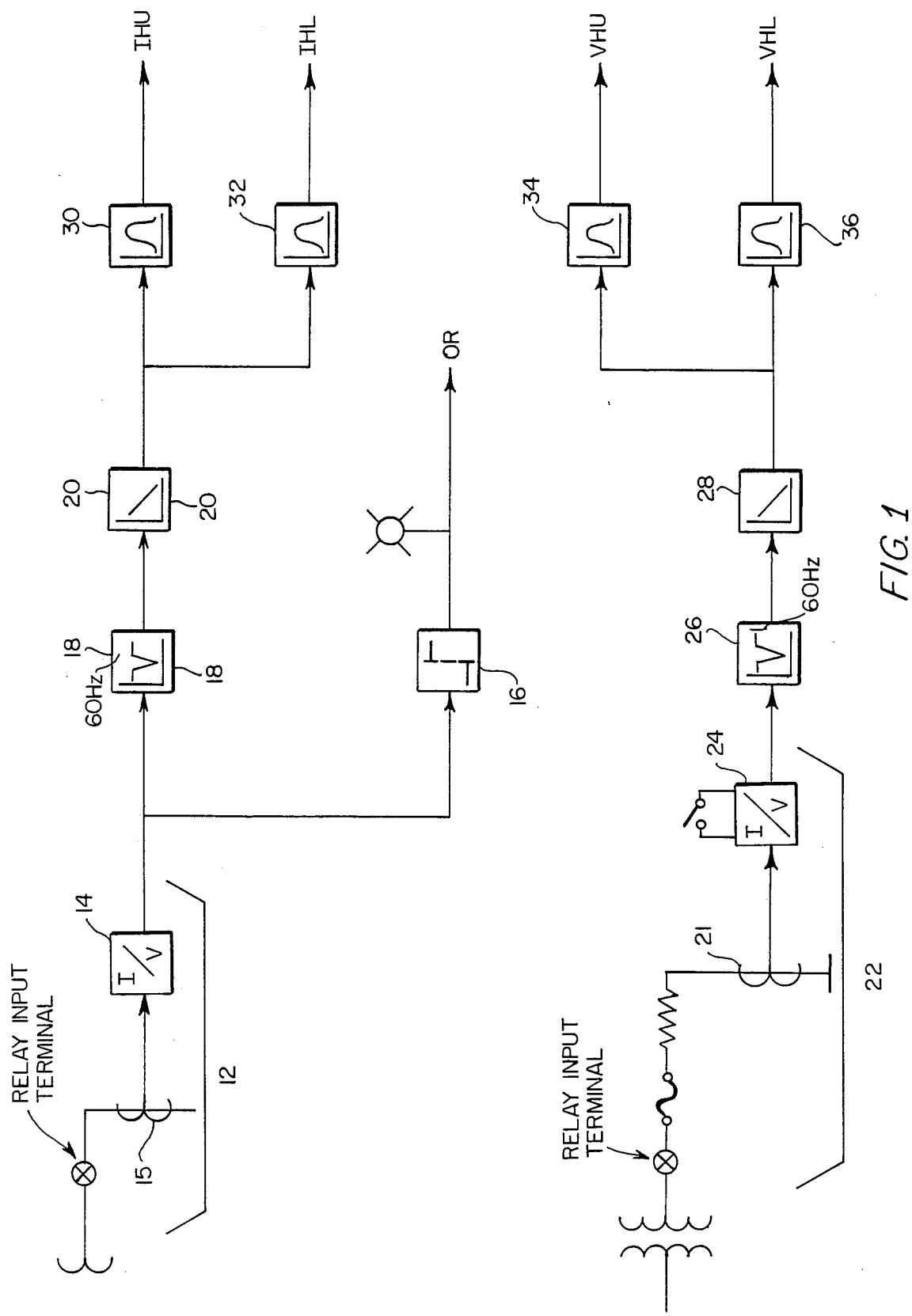
FIG. 1 is a partial block diagram of the relay device of the present invention.
Figure 2:
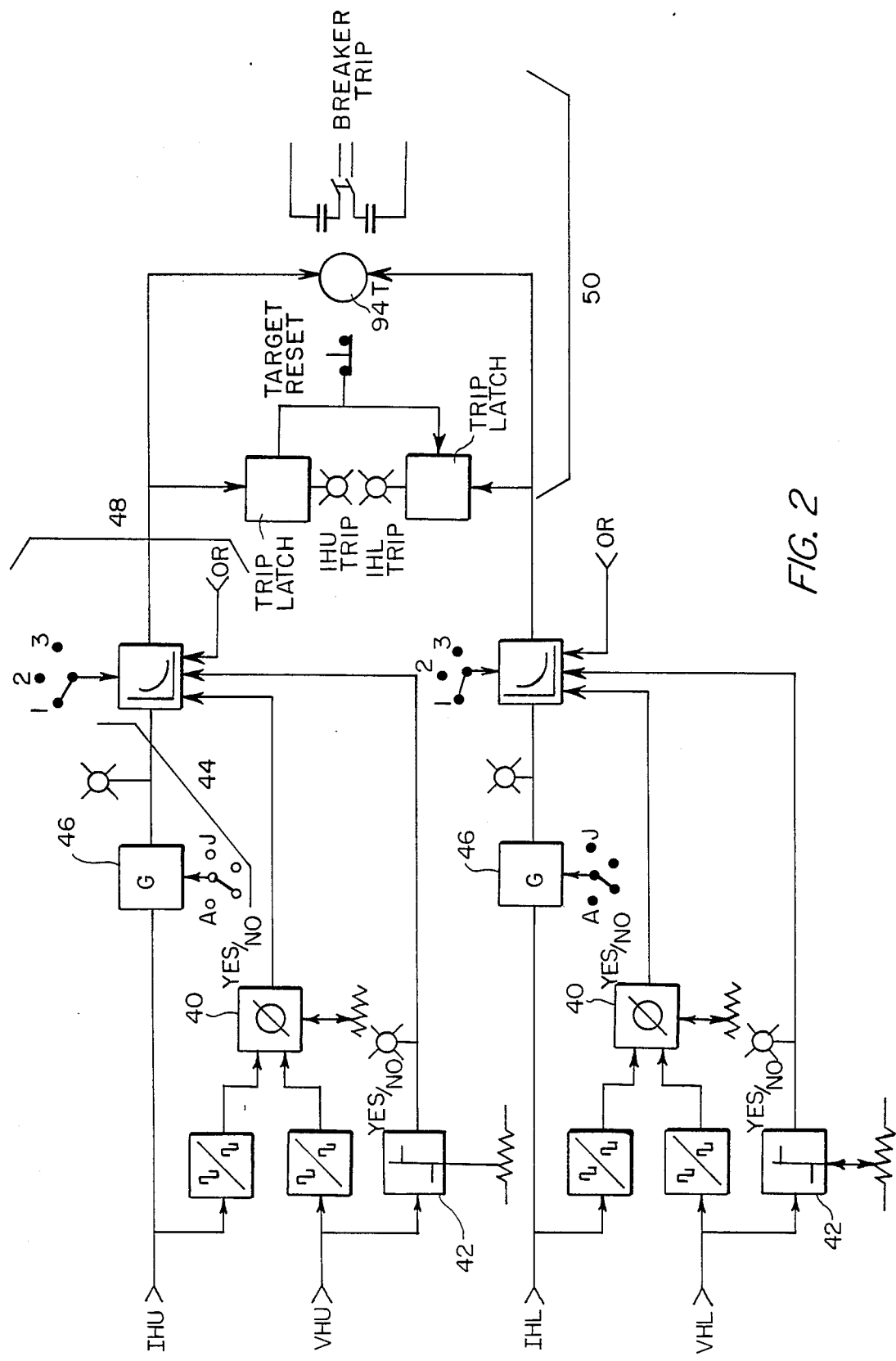
FIG. 2 is a continuation of the block diagram observed in FIG. 1.

A single-phase directional harmonic overcurrent relay device in accordance with the present invention is best observed in the block diagrams of FIGS. 1 and 2. Although not shown, it will be clear to those skilled in the art that this device can be constructed as a multiple phase device as well. As observed in FIG. 1, the relay device of the invention comprises a current input means 12 including one or more current transformers 15 which allow current from the power system being monitored to enter the relay, and which channel a signal proportional to the current to a harmonic current filter. It is preferred that at least one of the current transformers used is one which provides high sensitivity to detect very low levels of harmonic current. Accordingly, it is highly desirable to use a low harmonic distortion ferrite core current transformer. The extremely narrow B-H characteristic of ferrite is necessary to avoid the generation of spurious harmonic currents in the secondary winding. This transformer will have an input range from 10 A to 8.3 mA with a frequency response that is quite flat (less than 1% variation) to well beyond the 100th harmonic of the 60 hz power frequency. The use of this ferrite core current transformer will allow the device of the present invention to detect even very low levels of harmonic current.

As observed in FIG. 1, current transformer 15 channels the current received from the power system being monitored to at least one harmonic current filter. In the preferred embodiment shown, the relay employs an upper and a lower current band-pass filter, elements 30 and 32, respectively. In this embodiment, the current from transformer 15 goes first to a voltage converter 14 which converts the current to a voltage preferably with a scale factor of 1V peak (0.71V rms) equal 1A rms. The voltage signal corresponding to input current can then be directed to a current input overrange detector 16. When the input current sensed by the overrange detector 16 is greater than 10A rms, an inhibit signal is generated which corresponds to an overrange input. It is necessary to inhibit the relay due to power system frequency overcurrent because of the possibility of amplifier saturation. This would generate spurious harmonics in the relay which could cause the relay to false trip.

The signal from the current input means is also preferably made to travel through a notch filter 18 which can eliminate the 60 Hz component of the current signal. The notch filter can provide good suppression of the power system frequency current component over a range of 60±0.5 Hz. When combined with the harmonic current band-pass filters, the 60-Hz current component remaining is below the 5 $mV_p$ or less noise floor of the signal processing electronics. Consequently, the relay will be insensitive to 60-Hz current and will not operate for any value of 60-Hz current up to the momentary current rating. Also provided in the current input channel is a gain equalization section 20 which provides gain for the harmonics of 60-Hz and assures that, with equal levels of harmonic current into the relay input terminals, the 5th through 13th harmonic output levels will be within 5% of each other. The output of the gain equalization stage consists of harmonic current information with an extremely small residual 60-Hz component. This harmonic current information from the gain equalizer 20 is then transmitted to both the upper and lower harmonic current band-pass filters.

The upper and lower harmonic current band-pass filters 30 and 32, respectively, are provided to receive the signal from the current input means, as observed in FIG. 1. These current band-pass filters eliminate all harmonics except that to which the filters are tuned. The output of the current band-pass filters consists of a signal proportional to the harmonic current being monitored. These filters are capable of transmitting this signal to a phase angle comparator and other components such as a minimum current pickup means or variable gain stages for further processing.

Figure 7:
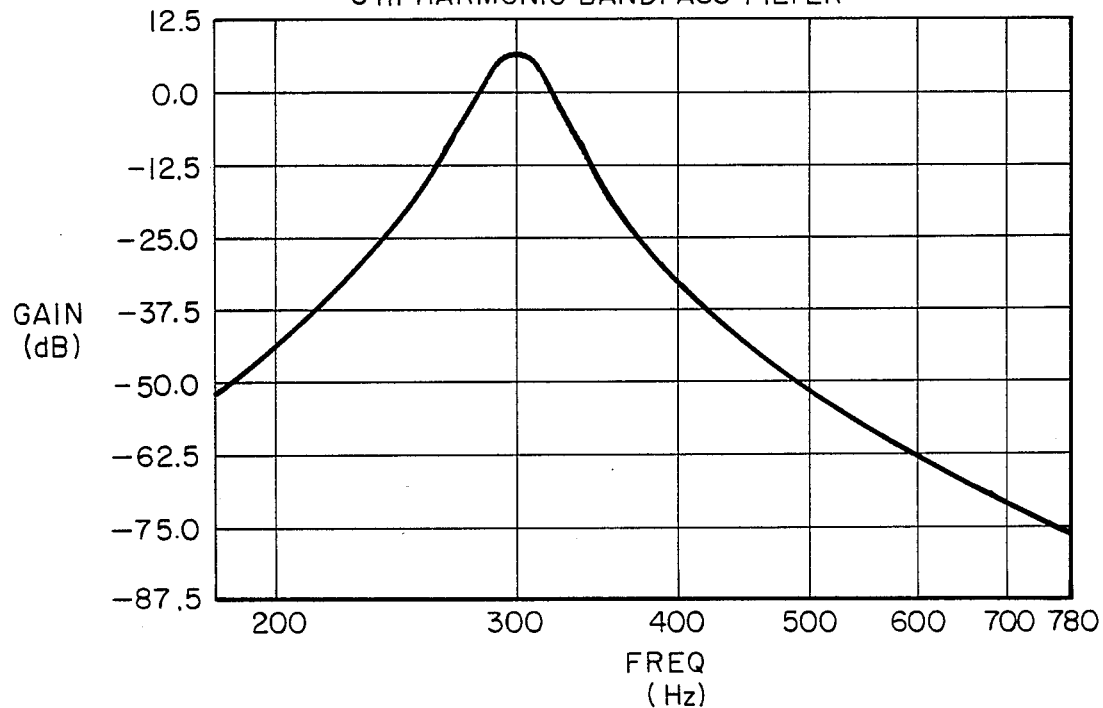
FIG. 7 is a graphic representation of harmonic band-pass filter frequency response curves.
Figure 7:
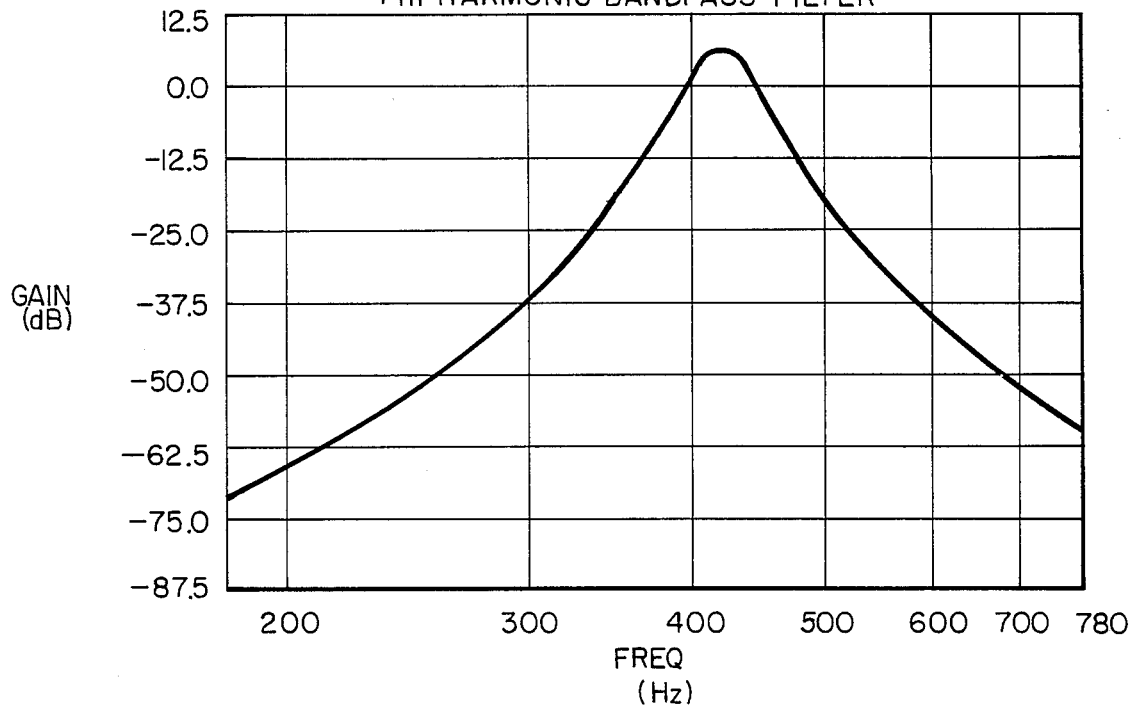

The relay device of the present invention is intended to monitor 5th, 7th, 11th, or 13th harmonic currents, however, the device can be employed to monitor other harmonic frequencies as well. When the relay is furnished with 5th and 7th harmonic band-pass filters, the tuned operating frequencies will be at 300 Hz and 420 Hz respectively, as can be observed in the graphs of FIG. 7. Alternatively, band-pass filters can be provided for the 11th and 13th harmonic frequencies at 660 Hz and 780 Hz respectively. As can be seen from the filter response curves of FIG. 7, the band-pass filters provide better than 40 dB adjacent 5th and 7th harmonic channel selectivity. For the harmonic operating current filters, this means that harmonic current of one channel will be attenuated to less than 1/100th in the other channel. This channel selectivity prevents the relay from producing a false minimum pickup output on one channel having no harmonic operating current, with adjacent channel harmonic operating current up to 100 times the current tap value of the inactive channel.

As indicated above, the harmonic current band-pass filters when combined with the notch filters provide excellent suppression of the power system frequency current component over a range of 60±0.5 Hz. The suppression of the band-pass filters and notch filters is better than 70 and 55 dB, respectively, of the power system frequency current component.

The relay device of the invention is also provided with a polarizing voltage input means which can be observed as well in FIG. 1. Polarizing voltage from the power system is applied to polarizing voltage input means 22 including a second low distortion current transformer 21 which also preferably has a ferrite core. The voltage input to the relay is preferably converted to a small current (between 10 and 20 mA) by a resistor before it reaches current transformer 21. The output of this transformer can be converted to a voltage by voltage converting means 24. By the use of a switch on the voltage converter 24, the circuit can be scaled to either 69V or 120V station voltages. As described for the current input channel above, the signal from the voltage input means is also preferably made to travel through a notch filter 26 and gain equalization section 28 with phase characteristics identical to those of the corresponding part of the current input circuit. As in the current input circuit, the 5th through 13th harmonic gains through the notch filter and equalization circuit are within 5% of each other although the overall gain in the voltage circuit is greater. A signal proportional to the system harmonic voltages is then transmitted to at least one harmonic voltage filter and in the embodiment shown, the signal is transmitted to upper and lower harmonic voltage band-pass filters 34 and 36, respectively. The harmonic signals at the outputs of the voltage and current input circuits are phase shifted the same amount. The relative phases of the two signals are maintained to within 1° as they pass through the input circuits.

The upper and lower harmonic polarizing voltage band-pass filters 34 and 36, as observed in FIG. 1, are capable of receiving a signal from the voltage input means 22 after it has passed through voltage converter 24, notch filter 26 and gain equalizer 28, and can eliminate all harmonics except that to which the filters are tuned. The output of these band-pass filters consists of a signal proportional to the harmonic voltage being monitored. These filters are capable of transmitting this signal to a phase angle comparator and to other components such as a polarizing voltage level detector for further processing. The filter characteristics of harmonic voltage band-pass filters 34 and 36 are nearly identical as those described for the harmonic current filters described above. As such, these voltage filters also operate so that practically all the 60-Hz component is removed from the voltage applied to the polarizing terminals. Consequently, the polarizing circuits will detect the specified range of harmonic voltage present in a composite wave form containing any value of 60-Hz voltage up to the maximum operating voltage rating. As indicated above, it is preferred that filters corresponding to the 5th and 7th harmonic frequency be employed, or, alternatively, the filters be used to monitor frequencies at the 11th and 13th harmonics. The 5th through 13th harmonic voltage components present in the voltage applied to the polarizing terminals of the relay can vary over a range of approximately 0.035 to 8.3 volts rms.

In the preferred embodiment of the present invention, the voltage and current signals coming from the harmonic band-pass filters are further screened before they are transmitted to the trip means. This aspect of the invention can be best observed in the block diagram of FIG. 2. As can be observed, voltage and current signals coming from either the upper or lower band-pass filters will be screened in the same manner. Accordingly, the following discussion will be directed to the voltage and current signals coming from the upper band-pass filters, but it will be understood that this description applies as well to the lower band-pass filters.

The relay of the present invention is provided with a phase detection means or phase angle comparator 40, as can be observed in FIG. 2, which is capable of receiving signals from the harmonic current and voltage filters. This phase angle comparator will ensure that a signal is transmitted to the trip means only when the phase angle between the harmonic phase current and harmonic phase-to-neutral voltage applied to the relay input terminals within a given set of phase angle values. Each harmonic channel must be set for the maximum absolute value of the angle between harmonic phase-to-neutral voltage and phase current permitted in the tripping direction. Neither harmonic channel will operate the tripping means even when the value of harmonic current is above a given tap value if the angle that the harmonic phase-to-neutral voltage leads or lags the phase current by an amount greater than the angle setting. Angle adjustment is set by measuring the voltage at specific test points, which is related to the maximum angle by the relationship:

$$A = -13.5V$$

wherein A is the absolute value of the angle in degrees and V is the voltage in volts measured at the test points. These test points can be indicated on a phase comparator card which will be discussed further below. The range of the phase angle adjustment is generally from about 25° to 90° (−1.9 to −6.8V).

Another feature of the present invention is a harmonic polarizing voltage level detector 42 which will allow the trip means to operate only when the magnitude of phase-to-neutral harmonic voltage rises above a particular setting. The harmonic voltage level detector is capable of receiving signals from at least one harmonic voltage filter and can transmit a control signal to a time-overcurrent generation means. Each harmonic channel must be set for a minimum phase-to-neutral harmonic polarizing operating voltage. When set, the voltage detector 42 ensures that the relay will not polarize on random occurrences of harmonic voltage near the noise floor of the power system. Harmonic current on the power system is generally caused by non-linear power devices acting as harmonic current sources. A phase-to-neutral harmonic voltage develops as a result of the harmonic current source driving current into the system impedance. The Thevenin impedance looking out from the harmonic current source is frequency dependent and is not usually equal to the 60-Hz value. Therefore, the magnitude and phase angle of the phase-to-neutral harmonic voltage with respect to the harmonic phase current is dependent on the power system impedance and the presence of other harmonic current sources at the harmonic frequency of concern. The voltage detector will thus act to disable the harmonic channel when sufficient polarizing voltage is no longer present.

The relay of the present invention is also provided with a harmonic current minimum pickup means 44, as indicated in FIG. 2. The current minimum pickup means ensures that harmonic current sensed by the upper band-pass filter will be above a minimum level or given tap value before a signal proportional to harmonic current magnitude will be sent to operate the trip means. In the preferred embodiment, harmonic current tap values corresponding to the 5th through 13th harmonics can be converted into corresponding tap switch positions from, for example, A through J, as indicated in FIG. 2. These switch positions will correspond to tap values of approximately 8.3, 16.7, 25.0, 33.0, 41.7, 54, 67, 87, and 104 milliamperes rms. When the variable gain stage 46 is set at a particular tap value by the corresponding tap value switch, the amount of harmonic current received at the relay input terminals must be at or above the tap value in order to operate the trip means. The relay will not be operated when any value of harmonic current sensed in the system is below the above tap settings.

Figure 6:
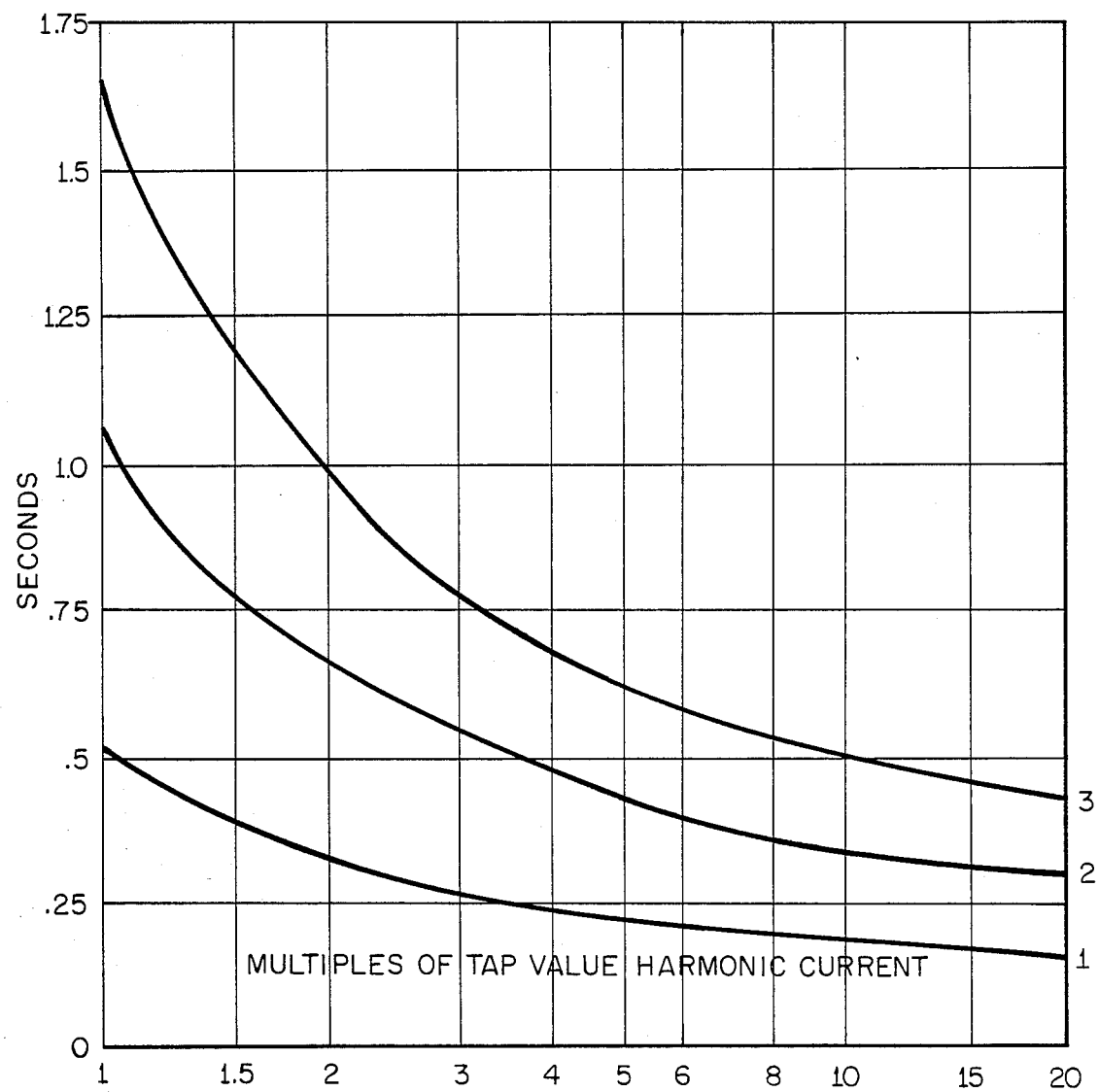
FIG. 6 is a graphic representation of time-harmonic overcurrent curves which can be used in conjunction with the time delay feature of the present invention.

Still another feature of the present invention is the time delay means which is indicated at 48 in FIG. 2. The time delay means employed is preferably a harmonic time-overcurrent generation device which initiates the trip circuit only when the harmonic current levels exist for given periods of time. It is preferred that three switch-selectable inverse time-overcurrent characteristic operating curves are provided for each harmonic current channel. Characteristic time-overcurrent curves associated with the time delay mechanism can be observed in the graph of FIG. 6. Using these curves, the relay of the invention will operate to transmit a signal to the trip means at the multiple of tap value harmonic current and time as indicated on the curves. The time given on the curves is accurate to within ±5% for all harmonic current tap values. Timing repeat accuracy is about ±1% throughout the range of operation.

The harmonic time-overcurrent generator 48 is capable of receiving signals from the harmonic polarizing voltage level detector 42, the phase detection means 40, the current overrange detector 16, and the harmonic current minimum pickup means 44. The time-overcurrent generator receives signals from these various monitors and transmits a signal to the trip means based on the time-overcurrent relationship curves. This feature of the invention allows for a sensing of the various overcurrent monitors of the invention and will ensure that the trip means is enabled only when a condition of overcurrent is sensed for a specific duration.

With the features of the present invention as described above, a trip means will be activated when the following conditions exist for either the upper or lower harmonic channel:

(1) Harmonic current at the frequency monitored is at or above the specified tap value;

(2) Harmonic phase-to-neutral voltage magnitude is greater than the minimum polarizing voltage selected;

(3) The phase angle between harmonic phase current and phase-to-neutral voltage is less than the maximum phase angle set;

(4) The harmonic overcurrent timer is timed out; and (5) Current into the relay input terminals is below 10 amps. In these cases, the trip means will remain closed as long as all of the above conditions exist. In general, the trip means is designed to open approximately 0.1–1.0 seconds after any trip condition ceases. The absence of a trip condition for phase angle, minimum polarizing voltage magnitude, current overrange, or harmonic voltage or current will prevent the trip means from being closed, although they generally will not affect any other function. Other features not discussed above can be added to the system where desired, such as a supervisory trip inhibit input inactive switch, or a power supply under voltage alarm system. In addition, a test trip button on the relay device of the present invention can be employed to test if the trip means is operational regardless of the status of the above trip conditions.

The device of the present invention further includes a suitable trip means 50 as indicated in FIG. 2. The trip means 50, once it has received a signal that a condition of overcurrent on either of the two harmonic frequencies monitored exists, is capable of signalling an appropriate protective or diagnostic device in order to correct, prevent or further research the problem. For example, the trip means can comprise a circuit suitable for signaling one or more power system circuit breakers. In the preferred embodiment, when the relay senses overcurrent at either upper or lower harmonic current levels, the device operates to close two isolated circuit breaker trip output circuits. However, it is also contemplated that the trip means of the present invention can trigger other protective or diagnostic devices such as an alarm signal to indicate a condition of harmonic overcurrent, or an SER (sequence of events recording) to record the condition for diagnostic purposes. In any event, the present invention is capable of monitoring overcurrent at one or more harmonic frequencies so that simultaneous monitoring of a condition of overcurrent at either of two harmonic frequencies can be achieved and a signal corresponding to this condition will be transmitted to the trip means.

By use of a sequence of events recorder, the device of the present invention can be used to make a recording of the signals involved corresponding to an overcurrent monitored by a specific component of the relay of the present invention. For example, when the current applied to the current input means is below an overrange value, the condition of overcurrent signal generated to the trip means. If the current input overrange detector of the present invention enables a sequence of events recorder, the relay is capable of producing a recording of the signal corresponding to the condition of input current overrange. Other sequence of events records can be similarly produced by employing SER's capable of recording the condition of harmonic overcurrent monitored above a given tap value, or those capable of recording the condition of harmonic voltage monitored above a minimum operating voltage.

Figure 3:
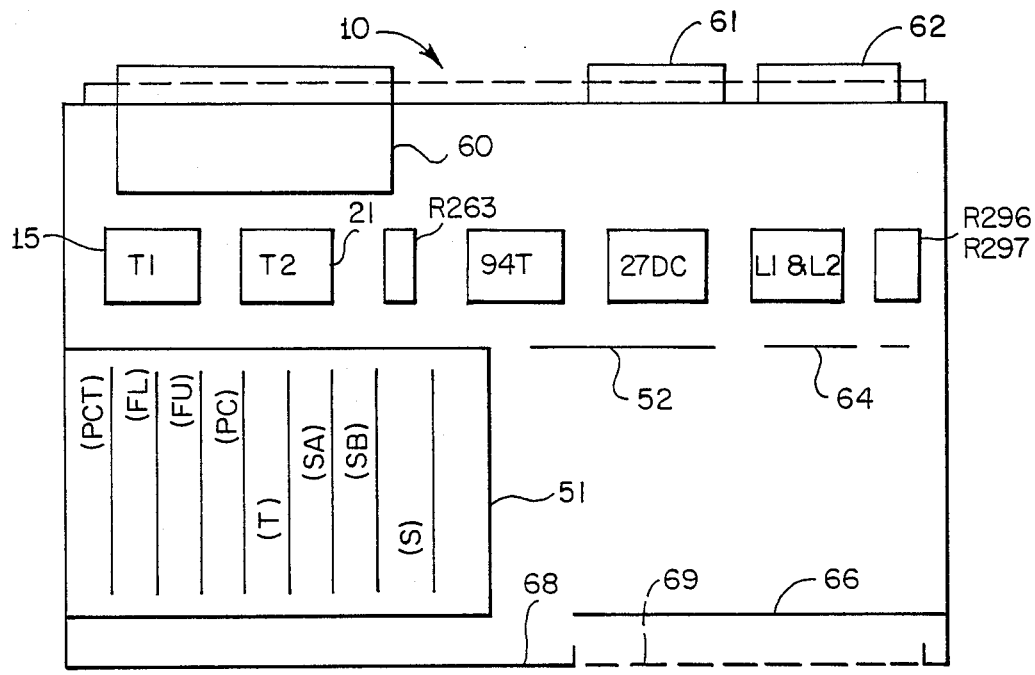
FIG. 3 is a schematic view of the internal layout of the present invention.
Figure 4:
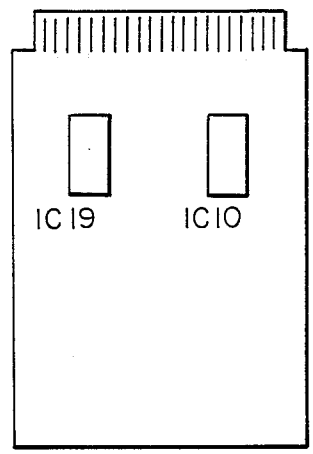
FIG. 4 is a schematic view of a filter card which can be employed in the present invention.
Figure 5:
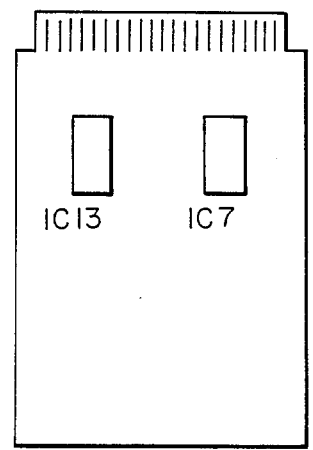
FIG. 5 is a view of a second filter card which can be used in the present invention.

The circuitry employed in constructing a relay in accordance with the present invention can be housed in a compact enclosure and it is preferred that a system of cards can be used to control all of the major features of the relay electronics. An apparatus 10 of this type suitable for use in the present invention is observed schematically in FIG. 3. The apparatus is characterized by a card cage 51, current and voltage transformers 15 and 21 respectively, test block 60, terminal blocks 61 and 62, and a 13.5 volt linear power supply 52. In the preferred embodiment, the card cage 51 has 8 slots corresponding to 7 plug-in cards relating to the relay electronics. One spare card socket (S) is provided which is wired to the power supply bus. The 7 plug-in cards consist of one potential and current input conditioning card (PCT), two lower and upper harmonic band-pass filter cards (FL and FU), one phase comparator card (PC), one inverse timer card (T), and two trip and SER output cards (SA and SB). An example of how the cards will look is provided in FIG. 4 which shows the 300-Hz harmonic band-pass filter card (for 5th harmonic) and in FIG. 5 which shows the 420-Hz harmonic band-pass filter card (for the 7th harmonic). As one would expect, the operation of the relay can be controlled by selection of the appropriate card for the apparatus. In particular, when it is desired to monitor the 5th and 7th harmonic currents, one will use the upper and lower harmonic band-pass filter cards associated with these harmonic frequencies. When it is desired to simultaneously monitor the 11th and 13th harmonic current, alternative filter cards corresponding to these frequencies can be selected and can be placed into the appropriate slots in the card cage. The relay apparatus 10 is also preferably constructed with a switching pre-regulator 64, a front subpanel 66, a fold-down front panel 68, and a viewing window 69.

Figure 8:
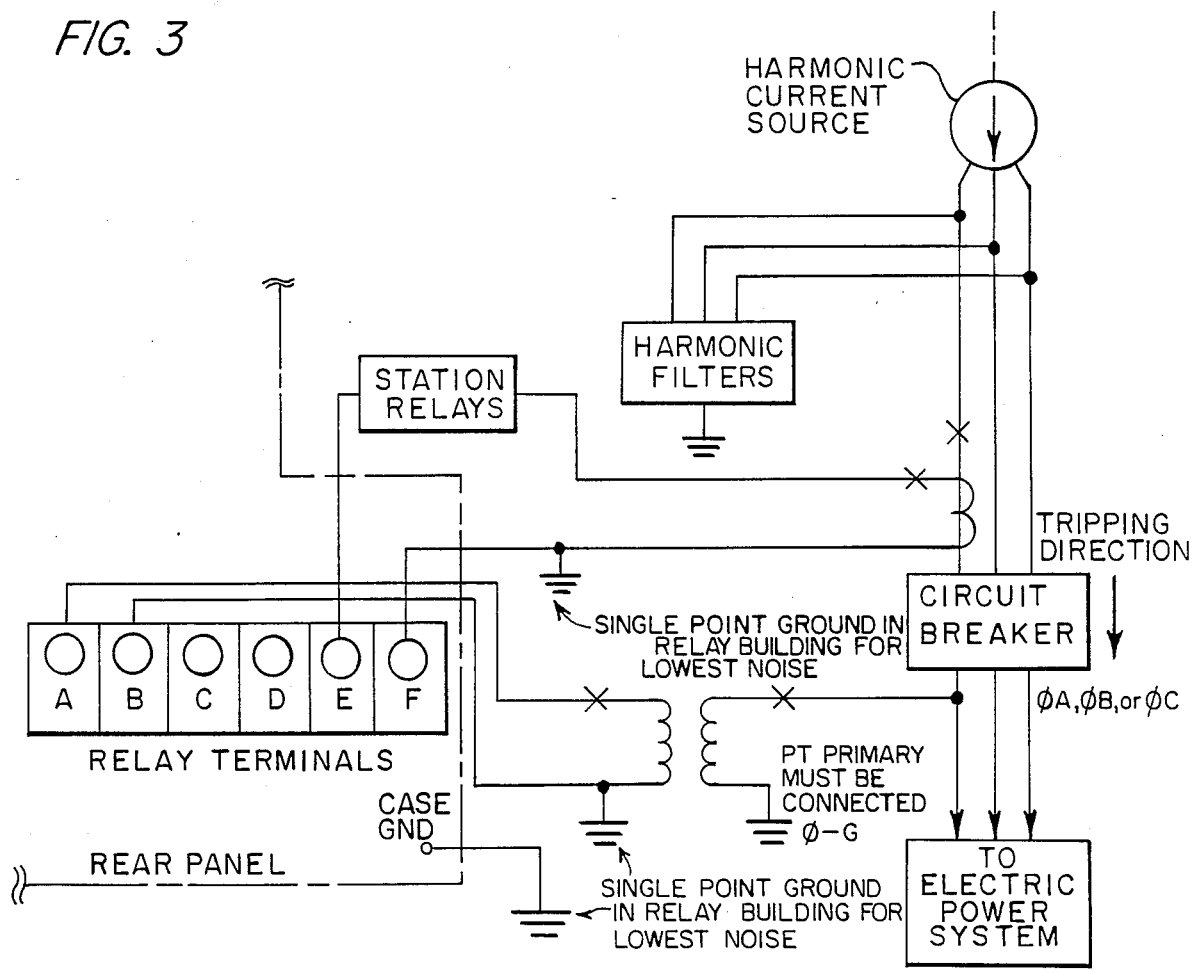
FIG. 8 is a schematic view of the external connections of the relay of the present invention.

In operation, the relay should be located in an area free from dirt, moisture, and excessive vibration and temperature. Adequate clearance should be provided around the back of the relay and closure for proper ventilation. The apparatus should be grounded to station ground with a ground wire connected to a ground screw on the back of the apparatus. An example of the relay connections can be observed in the schematic external diagram as shown in FIG. 8. As indicated in FIG. 8, the station voltage transformer and current transformer circuits must be connected to the relay terminals in the polarity shown for the tripping direction indicated. The relay will not operate to close the trip means if it is connected in the reverse direction. When used in accordance with the description provided herein, the directional relay device of the present invention can be used successfully to simultaneously monitor overcurrents at either of two harmonic frequencies in an electric power system.

Although the relay device of the present invention preferably monitors any two harmonic currents and voltages at the 5th, 7th, 11th, or 13th harmonic of a 60-Hz power system frequency, the device can be constructed to monitor any number of other harmonic frequencies of various power system frequencies as well. The device can also be constructed to monitor more than one phase of an electric power system, to provide other harmonic current tap values, and to provide other harmonic time-overcurrent characteristic operating curves.

What is claimed is:

1. A single or multiple phase directional harmonic overcurrent relay device for monitoring currents at one or more harmonic frequencies in an electric power system comprising:
   a current input means for allowing current from the power system being monitored to enter said relay device and for channeling a signal proportional to said current to a harmonic current filter;
   a current input overrange detector capable of receiving a signal from said current input means and capable of transmitting an inhibit signal to a harmonic time-overcurrent generation means when the signal received from the current input means corresponds to a condition of current overrange;
   a polarizing voltage input means for allowing polarizing voltage from the power system being monitored to enter said relay device and for channeling a signal proportional to said polarizing voltage to a harmonic voltage filter;
   at least one harmonic current filter capable of receiving a signal from said current input means and capable of channelling a signal proportional only to the particular harmonic frequency being monitored to a phase detection means and a minimum current pickup means;
   at least one harmonic voltage filter capable of receiving a signal from said polarizing voltage input means and capable of channeling a signal proportional only to the particular harmonic frequency monitored to a polarizing voltage level detection means and a phase detection means:
   a harmonic polarizing voltage level detector capable of receiving signals from at least one harmonic voltage filter and capable of transmitting a control signal to a harmonic time-overcurrent generation means;
   harmonic current minimum pickup means capable of receiving signals from said harmonic current filters and capable of transmitting a signal proportional to the magnitude of the harmonic current to a harmonic time-overcurrent generation means;
   harmonic phase detection means capable of receiving signals from said harmonic current and voltage filters and capable of transmitting a signal to a harmonic time-overcurrent generation means when the phase angle between the harmonic current and polarizing voltage falls within a given set of values;
   harmonic time-overcurrent generation means capable of receiving signals from said harmonic polarizing voltage level detector, said harmonic phase detection means, said current input overrange detector, and said harmonic current minimum pickup means, and capable of signaling a trip means when a condition of overcurrent is sensed for a given duration of time; and
   a trip means capable of receiving signals from the harmonic time-overcurrent generation means, and capable of signaling an appropriate external protective or diagnostic device when a condition of overcurrent is present.

2. A device according to claim 1 wherein a signal corresponding to a condition of overcurrent is only transmitted to said trip means when the current at the harmonic frequency monitored is above a given tap value.

3. A device according to claim 2 further comprising a sequence of events record signal and which is capable of signaling to an external recording device the condition of harmonic overcurrent monitored above a given tap value.

4. A device according to claim 1 wherein a signal is transmitted to said trip means only when the harmonic voltage sensed is above a minimum operating voltage.

5. A device according to claim 4 further comprising a sequence of events record signal and which capable of signaling to an external recording device the condition of harmonic voltage monitored above a minimum operating voltage.

6. A device according to claim 1 wherein the current input means includes a current transformer.

7. A device according to claim 6 wherein the current transformer produces extremely low harmonic distortion.

8. A device according to claim 6 wherein the current transformer comprises a ferrite core current transformer.

9. A device according to claim 1 wherein the voltage input means includes a current transformer.

10. A device according to claim 9 wherein the voltage input means includes a resistor to convert the input voltage to a current before it is received by the current transformer.

11. A device according to claim 9 the current transformer produces extremely low harmonic distortion.

12. A device according to claim 9 wherein the current transformer comprises a ferrite core current transformer.

13. A device according to claim 1 wherein the trip means comprises circuits suitable for signaling one or more power system, circuit breakers or other protective devices.

14. A device according to claim 1 wherein the trip means activites an alarm.

15. A device according to claim 1 wherein the trip means activates a sequence of events recorder which is capable of recording the signal corresponding to the condition of harmonic overcurrent, for diagnostic purposes.

16. A device according to claim 1 further including notch filters disposed between said current and voltage input means and said harmonic current and voltage filters which suppress the power system frequency component of the current and voltage signals.

17. A device according to claim 1 further comprising gain equalization sections disposed between said current and voltage input means and said harmonic current and voltage filters which are capable of equalizing the levels of harmonic currents and voltages which enter the relay device.

18. A device according to claim 1 wherein a series of filter cards may be employed in order to monitor specific harmonic currents and voltages.

19. A device according to claim 1 wherein the 5th and 7th harmonic currents and voltages are simultaneously monitored.

20. A device according to claim 1 wherein harmonic frequencies at around 300 Hz and around 420 Hz are monitored simultaneously.

21. A device according to claim 1 wherein the 11th and 13th harmonic currents and voltages are simultaneously monitored.

22. A device according to claim 1 wherein harmonic frequencies at 660 Hz and 780 Hz are simultaneously monitored.

23. A device according to claim 1 wherein a signal corresponding to a condition of overcurrent is only transmitted to said trip means when the current applied to said current input means is below an overrange value.

24. A device according to claim 23 comprising a sequence of events record signal and which is capable of signaling to an external recording device the condition of input current overrange.

* * * * *